US009887927B2

(12) United States Patent
Golla et al.

(10) Patent No.: US 9,887,927 B2
(45) Date of Patent: Feb. 6, 2018

(54) END-TO-END CREDIT RECOVERY (71) Applicant: Brocade Communications Systems, Inc., San Jose, CA (US)

(72) Inventors: Narasimha Golla, San Jose, CA (US); John Terry, San Jose, CA (US); Kung-Ling Ko, Union City, CA (US); Abhay Gupta, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 243 days.

(21) Appl. No.: 14/511,155

(22) Filed: Oct. 9, 2014

(65) Prior Publication Data

US 2015/0103656 A1   Apr. 16, 2015

Related U.S. Application Data

(60) Provisional application No. 61/889,312, filed on Oct. 10, 2013.

(51) Int. Cl.
*H04L 12/16* (2006.01)
*H04L 12/801* (2013.01)

(52) U.S. Cl.
CPC .............. *H04L 47/39* (2013.01); *H04L 47/18* (2013.01)

(58) Field of Classification Search
CPC combination set(s) only.
See application file for complete search history.

(56) References Cited

U.S. PATENT DOCUMENTS

2003/0037159 A1\* 2/2003 Zhao ....................... H04L 47/20
                                                        709/232
2005/0018674 A1\* 1/2005 Dropps ................. H04L 49/506
                                                        370/389

\* cited by examiner

*Primary Examiner* — Yemane Mesfin
*Assistant Examiner* — Mon Cheri Davenport
(74) *Attorney, Agent, or Firm* — Blank Rome, LLP (57) ABSTRACT

Packets or data units and their related credit returns each include an assigned phase value. When a credit test is desired, the phase value of outgoing data units is changed, for example from 0 to 1, and a new counter is set to a value of the outstanding credits having the original phase value. With each original phase credit received, the counter value is decremented. When a credit having the new phase value is received, the counter value indicates the amount of any credit error and appropriate corrections may be made.

12 Claims, 14 Drawing Sheets

END-TO-END CREDIT RECOVERY

RELATED APPLICATIONS

This application is a non-provisional application of Ser. No. 61/889,312, titled "End-to-End Credit Recovery," filed Oct. 10, 2013, which is incorporated herein by reference.

BACKGROUND OF THE INVENTION

1. Field of the Invention

The invention relates to network devices. More particularly, this invention relates to a system, method, and apparatus for determining that credits in an end-to-end credit networking system are correctly transferred and, when they are not, accounting for the mismatched credits to mitigate network interruptions.

2. Description of the Related Art

In a typical closed loop credit system, the system generally insures that no data units are lost due to congestion or processing. However, these systems are not immune from problems, such as line errors on the media for transmitting data between sender and receiver devices. Take, for example, the typical closed loop credit system 100 illustrated in FIG. 1. The network 100 is comprised of node 102, which is connected to device 104 (e.g., a switch). Device 104 is connected to device 106 (e.g., a switch), which in turn is connected to device 108 (e.g., a switch). Device 108 is connected to node no. For purposes of illustration, packets flow from node 102 to node no in this example. To maintain efficient traffic flow, devices 104 and 108 monitor end-to-end credits between one another. Device 104 will initially have a number of starting credits, referred to as "initialized_credits." Device 104 will also have a "tx_credits" counter value 112, which indicates how many credit units are available to be sent from device 104. In this example, "tx_credits" 112 has a value of "1", because all but one of the "initialized_credits" is outstanding. The number of outstanding credits available is calculated by decrementing the "tx_credits" value 112 by one for each unit of data sent from device 104. This decrementing continues for each credit sent until the transmit credits are exhausted (i.e., "tx_credits" equals "0"), at which time device 104 must cease transmitting any further data units.

Figure 1:
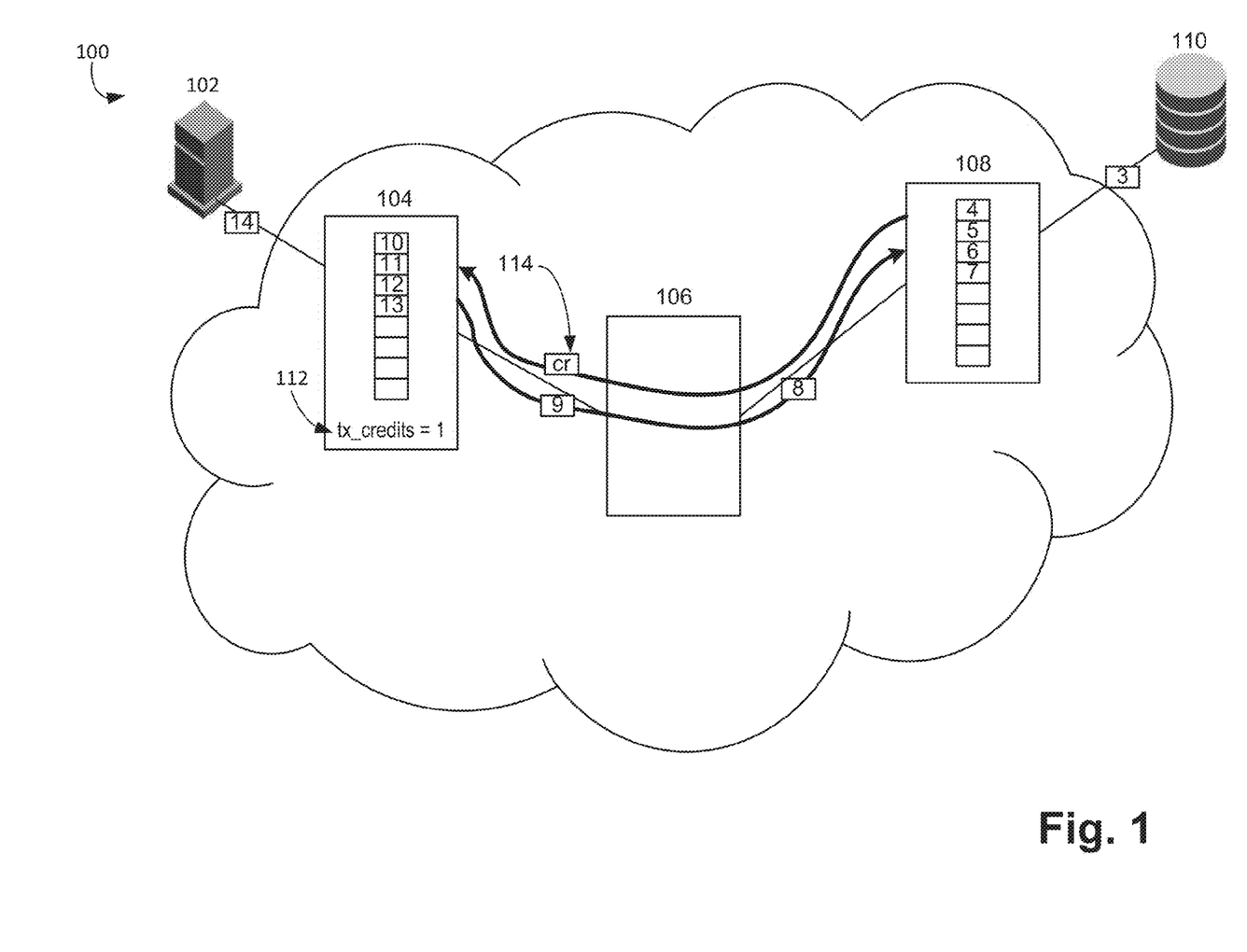
FIG. 1 is a block diagram of a network illustrating end-to-end credits according to the present invention.

Device 108 includes sufficient allocated storage resources to store all the data units that device 104 is granted to send to device 108, which again is based upon the "initialized_credits" value. After a data unit arrives at device 108, device 108 stores the data unit as needed until it can dispatch the data unit to node no and recover the storage space occupied by the data unit. Only after dispatching the data unit to node no will device 108 return a credit 114 back to device 104. Device 104 then uses the returned credit 114 to increment "tx_credits", thereby allowing device 104 to send an additional data unit according to the exact same process.

The above depiction and the following embodiments are simplified by only illustrating unidirectional data flow, even though both devices 104 and 108 may have send and receive functions to allow full-duplex operation with bi-directional data flow and signaling.

As previously stated, this system is not immune from errors, predominately due to line errors on the media between sender and receiver. Such errors cause two classes of problems. The first class of problems may be referred to as "loss of credits," which is any problem that causes the total credits in the system to be lower than expected. Such errors cause reduction of throughput, or zero throughput in a worst case scenario. This can happen in two circumstances: (1) a credit return message is corrupted and not recognized by device 104; and/or (2) data units are lost or reduced in size as they travel across the path between device 104 and 108.

The second class of problems may be referred to as "excess credits," which is any problem that causes the total credits in the system to be greater than expected. Such errors create a buffer overflow at device 108. Such a buffer overflow situation may occur when: (1) framing errors cause the data unit size to increase, or spurious data units to appear at device 108; or (2) mutation of signaling causes spurious credit returns to appear at device 104.

The typical method to detect a change in total system credits is to acquiesce all traffic for a sufficient time so that all data units are allowed to be dispatched and all credit returns are allowed to arrive back to device 104. Under this method, the "tx_credits" value should return to the "initialized_credits" value in the absence of any errors. However, an interruption in service is required to perform this checking method, and such interruptions in service are generally unacceptable.

The Fibre Channel ("FC") protocol defines a scheme, which is fully described in the FC standards document FC-FS3, Section 19.4.9., whereby the sender and receiver utilize a checkpoint system to identify every $N^{th}$ data unit or credit (respectively). If the peer detects an error upon arrival of the $N^{th}$ data unit or credit, adjustments can be made to correct any credit discrepancy. This scheme is complex in that it requires both sender and receiver to actively detect and manage the recovery of unidirectional data flow. Additionally, there are other complications that result from the potential corruption of the checkpoint signal itself. As such, the need exists for an improved system, method, and apparatus for verifying the accuracy of end-to-end credit systems and improving credit recovery when those systems yield errors.

SUMMARY OF THE INVENTION

In embodiments according to the present invention, outgoing credits of packets or data units are each assigned a phase value. When a credit test is desired, the phase values of outgoing data units are changed from an original phase value (e.g., "0") to a new phase value (e.g., "1") and a new counter is created (e.g., "busy_credits") that is set to the value of outstanding credits. With each phase credit returned back having the original phase value the new counter value is decremented by one. When the first credit with a new phase value returns to the originating device, the check process is complete. If the new counter value is anything but zero, it may indicate the level of credit mismatch and appropriate corrections can be made.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

FIGS. 2A-2I illustrate operation of the network of FIG. 1 according to a preferred embodiment of the present invention, where a simplified scheme to detect and recover credit errors on the fly is shown. In operation, it may be assumed the receiver device 208 always dispatches the credit returns on a first-in, first-out ("FIFO") basis. This is a notable difference from the FC scheme discussed above, which does not have such a requirement.

Figure 2A:
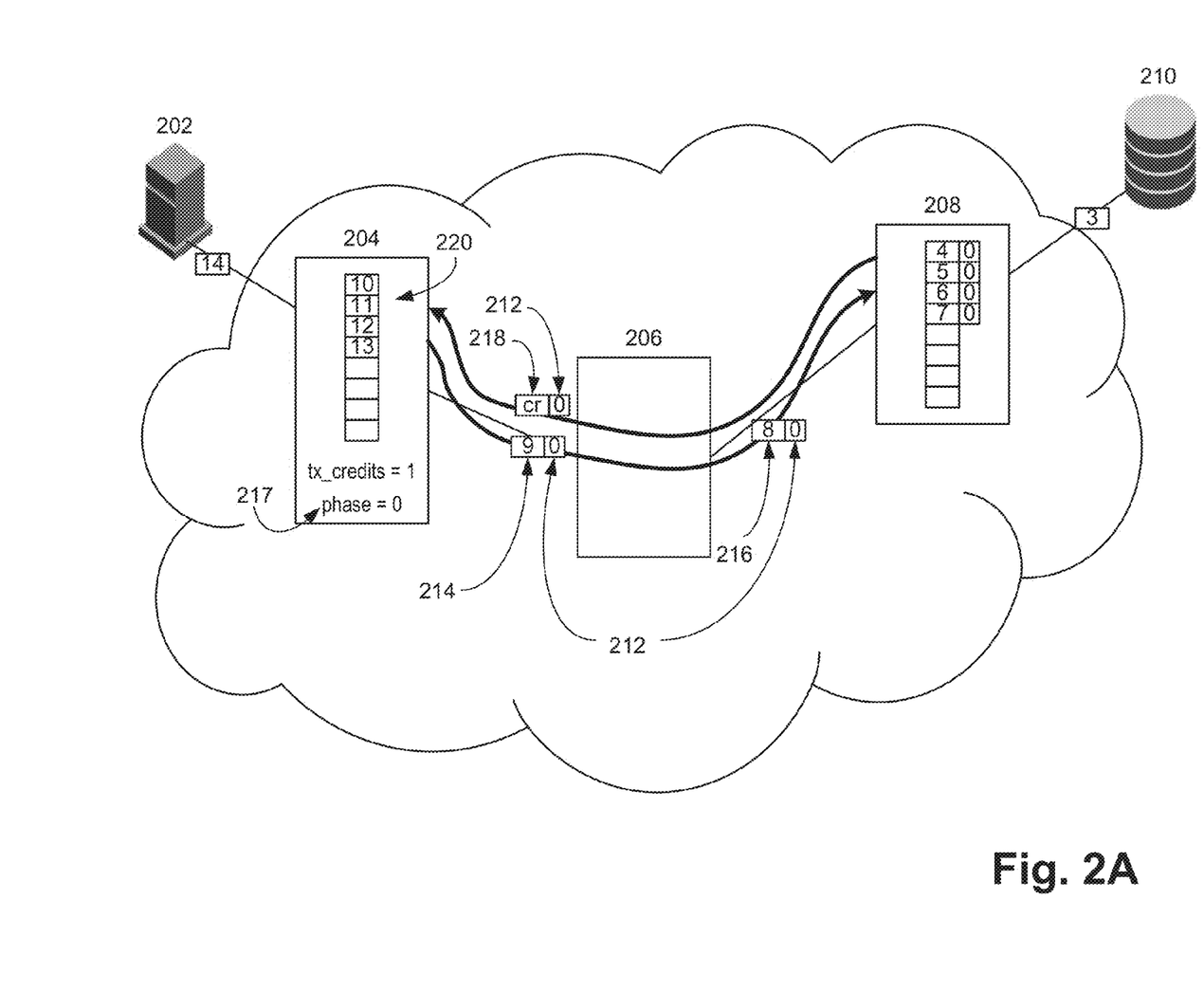
FIGS. 2A-2I are block diagrams of a network according to the present invention for detecting lost end-to-end credits with illustrations of packet and credit flow according to the present invention.

In the preferred embodiment, a single bit "phase" value 212 is added into the forward traveling data units 214 and 216 and the reverse direction credit return messages 218, as shown in FIG. 2A. In the preferred embodiment this phase value is stored in a processor-accessible register and added to the data unit transmission. By default, the data units 214, 216 are stamped with "0" as the phase value as shown, which is set by a phase state setting 217 on device 204. Ideally, each credit return 218 should be sent back to device 204 with the same phase value 212 that accompanied the corresponding forward traveling data unit. In other words, when a data unit with a phase value of "0" is transmitted from device 208 to node 210, the corresponding return credit should ideally also have a phase value of "0".

Figure 2B:
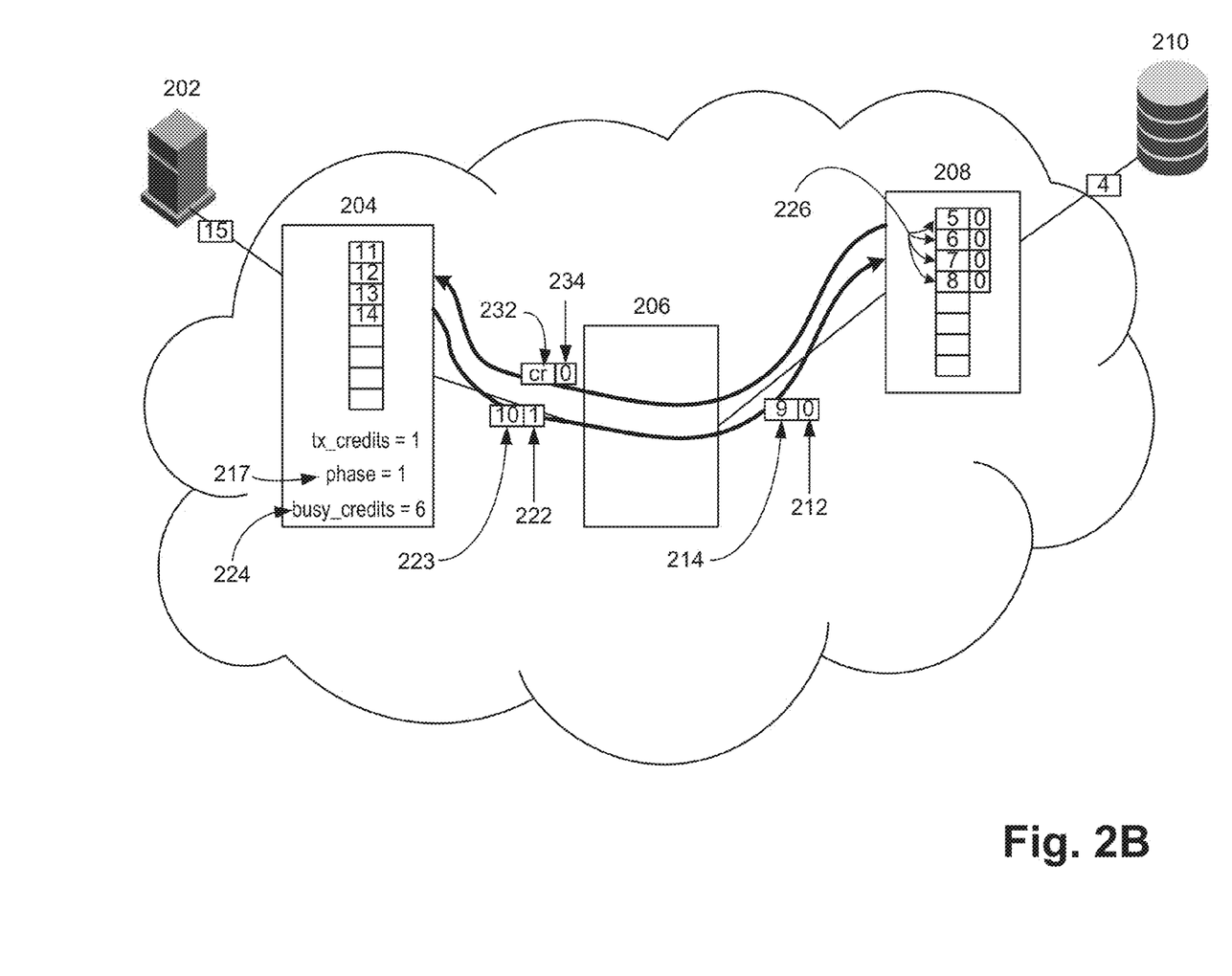

When device 204 performs a credit correctness check, device 204 toggles the phase state setting 217 in order to modify the subsequent data units to be transmitted 220 (e.g., data units 10-13) from a phase value of "0" to a phase value of "1". In the preferred embodiment this can be done by the processor changing the value of the phase bit in the register. This is shown in FIG. 2B, where the phase value 222 corresponding to data unit 223 is set to "1", as opposed to the phase value of "0" 212 for data unit 214, which was transmitted when the phase state setting was still "0".

When the phase state setting 217 is changed, device 204 generates a value for new counter "busy_credits" 224 and stores it into a signed holding register of device 204. The value of counter "busy_credits" 224 is calculated by subtracting "initialized_credits" from "tx_credits," both of which were previously defined. As previously discussed, "initialized_credits" is the number of credits the system should ideally operate with. In this embodiment, the value of "busy_credits" 224 is "6", as there are 4 data units 226 (i.e., data units 5-8) at device 208 and data units 214 and 223 are still in transit. For every credit with a phase equal to "0" returned to device 204 by device 208, the "busy_credits" value is decremented by 1. This process is illustrated in FIGS. 2C-2H.

Figure 2C:
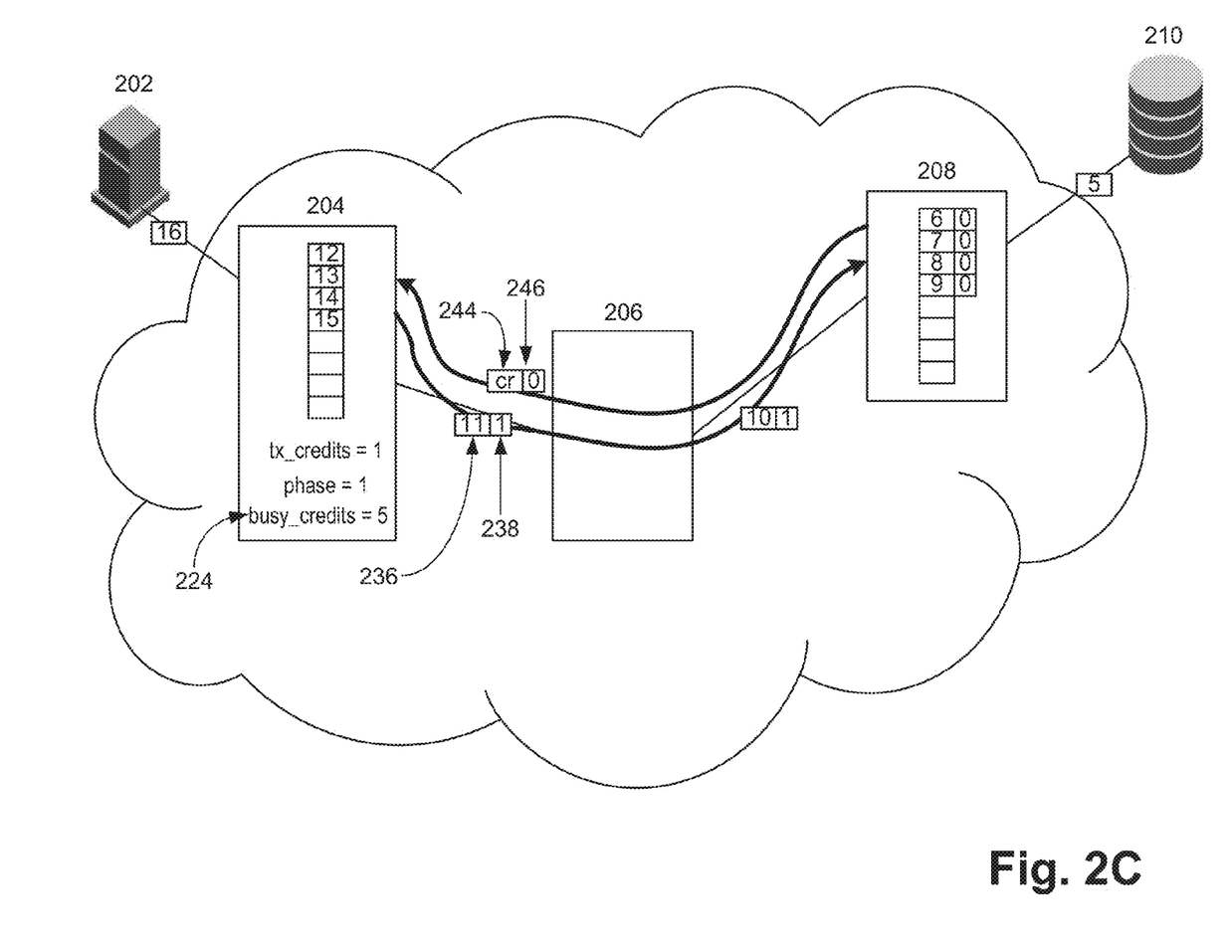

Starting with FIG. 2C, newly transmitted data unit 236 with a phase value of "1" 238 is transmitted and "busy_credits" 224 has been decremented by one (from "6" to "5") for the previous credit returned 232 (FIG. 2B), which had a phase value of "0" 234. This decrementing process continues until the first credit return with a phase value of "1" arrives at device 204, thus concluding the check-portion of the routine. The entire process is illustrated in remaining FIGS. 2D-2I, as discussed in greater detail below.

Figure 2D:
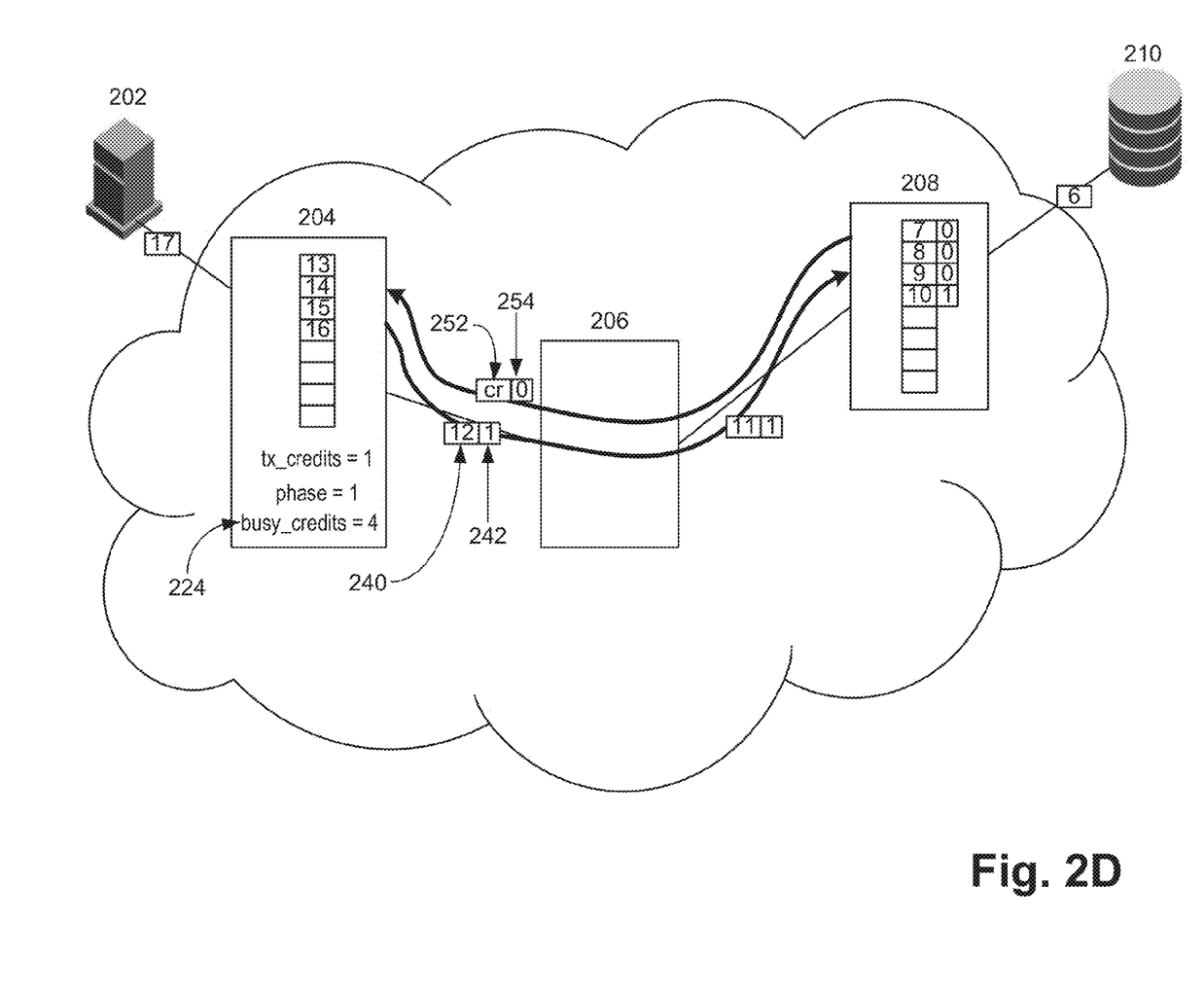

Turning to FIG. 2D, new data unit 240 with a phase value of "1" 242 is transmitted and "busy_credits" 224 again decreases by one (from "5" to "4") for the previous credit returned 244 (FIG. 2C), which had an assigned phase value of "0" 246.

Figure 2E:
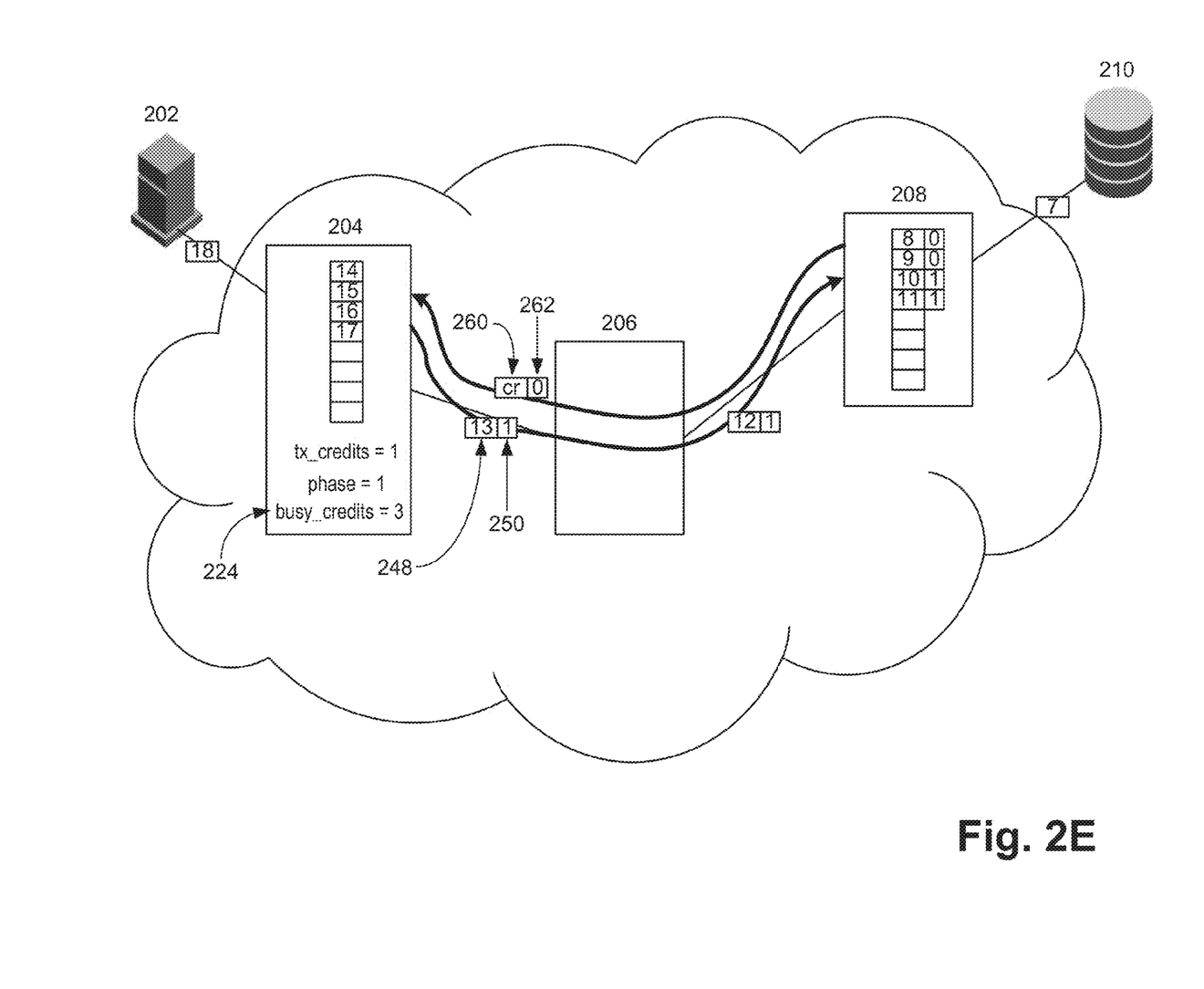

Turning to FIG. 2E, new data unit 248 with a phase value of "1" 250 is transmitted and "busy_credits" 224 has been decremented by one (from "4" to "3") for the previous credit returned 252 (FIG. 2D), which had a phase value of "0" 254.

Figure 2F:
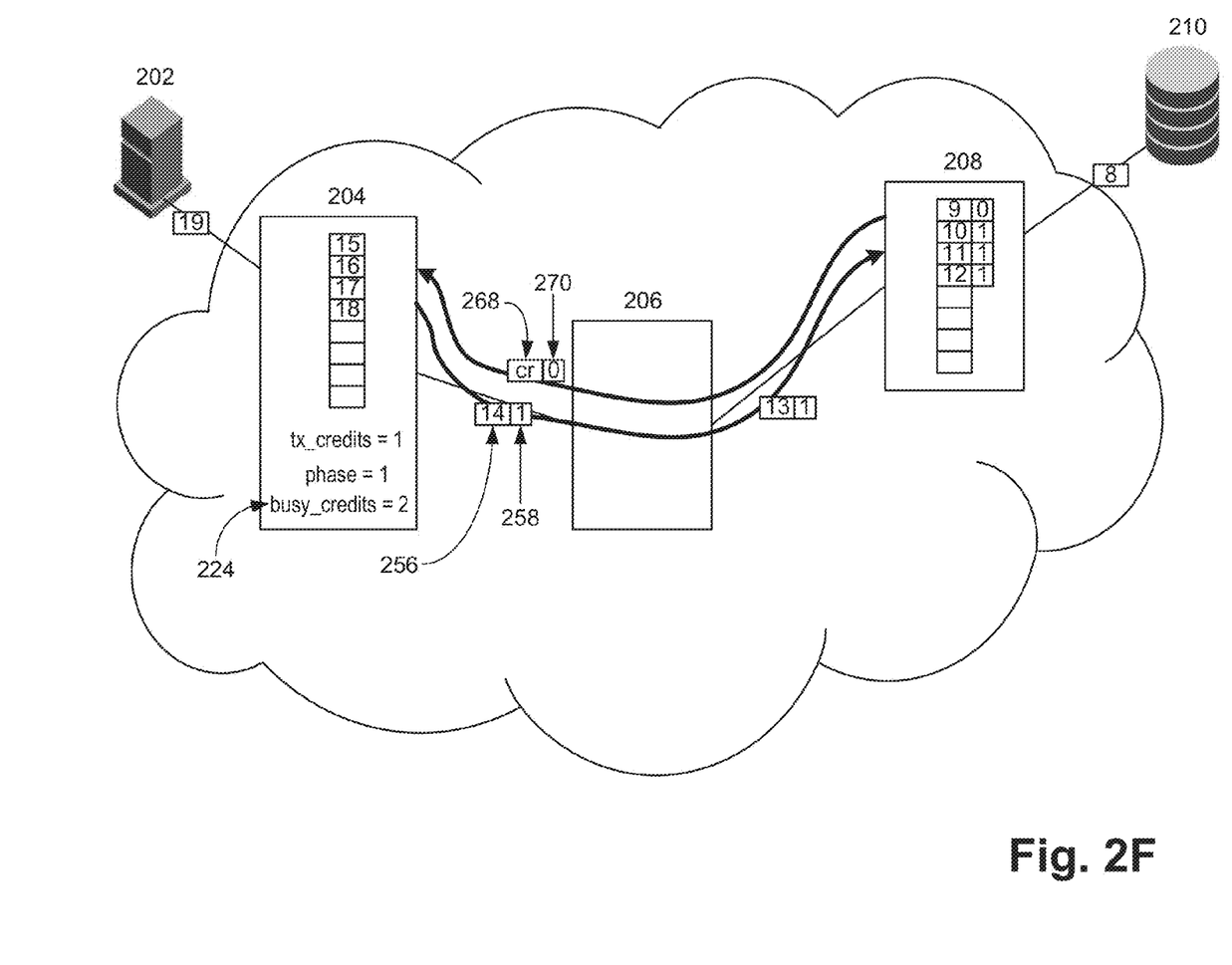

Turning to FIG. 2F, new data unit 256 with a phase value of "1" 258 is transmitted and "busy_credits" 224 has been decremented by one (from "3" to "2") for the previous credit returned 260 (FIG. 2E), which has a phase value of "0" 262.

Figure 2G:
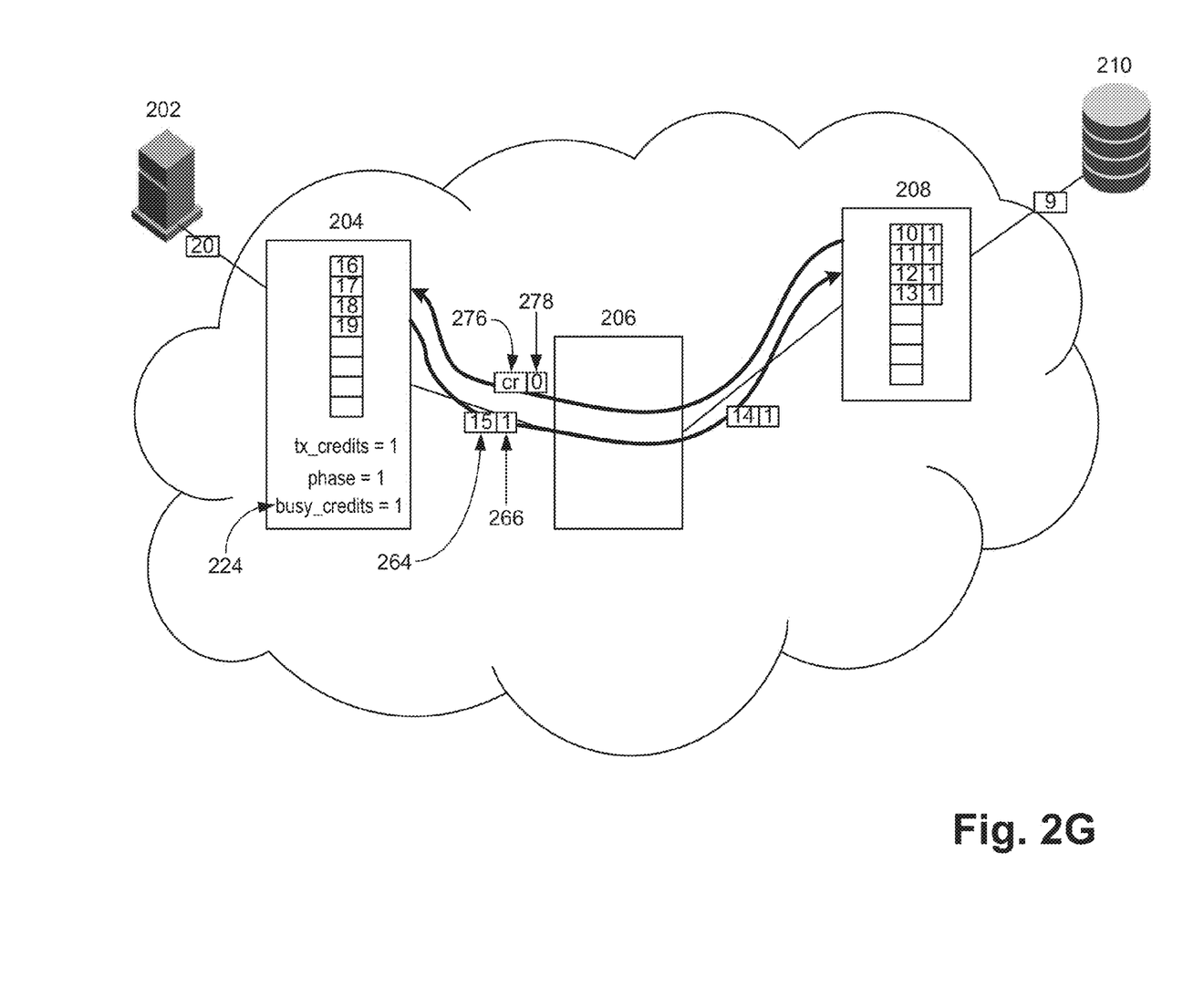

Turning to FIG. 2G, new data unit 264 with a phase value of "1" 266 is transmitted and "busy_credits" 224 has been decremented by one (from "2" to "1") for the previous credit returned 268 (FIG. 2F), which had a phase value of "0" 270.

Figure 2H:
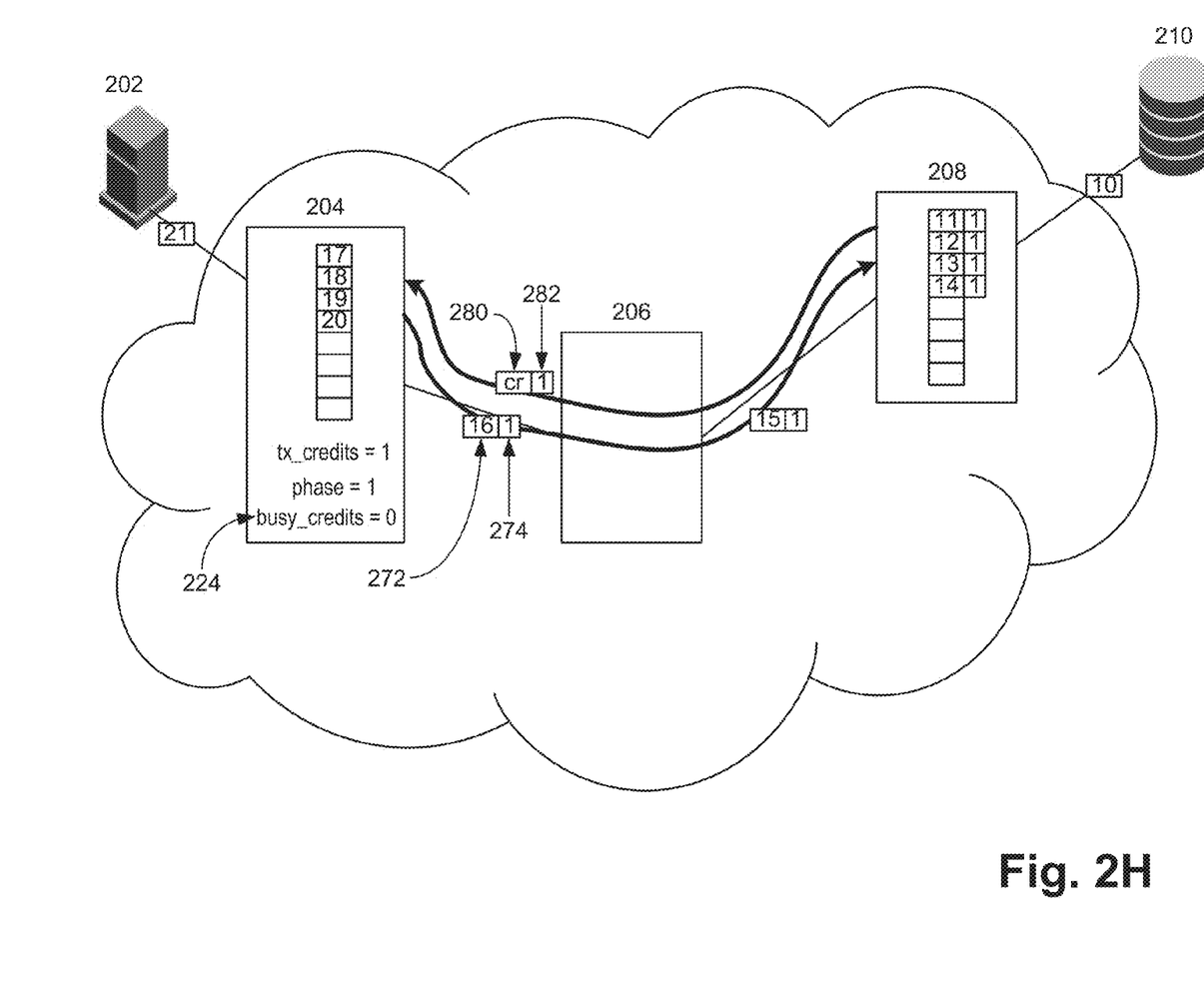

Turning to FIG. 2H, new data unit 272 with a phase value of "1" 274 is transmitted and "busy_credits" 224 has been decremented by one (from "1" to "0") for the previous credit returned 276 (FIG. 2G), which has a phase value of "0" 278. Notably, the current return credit 280 in transit has a phase value "1".

Figure 2I:
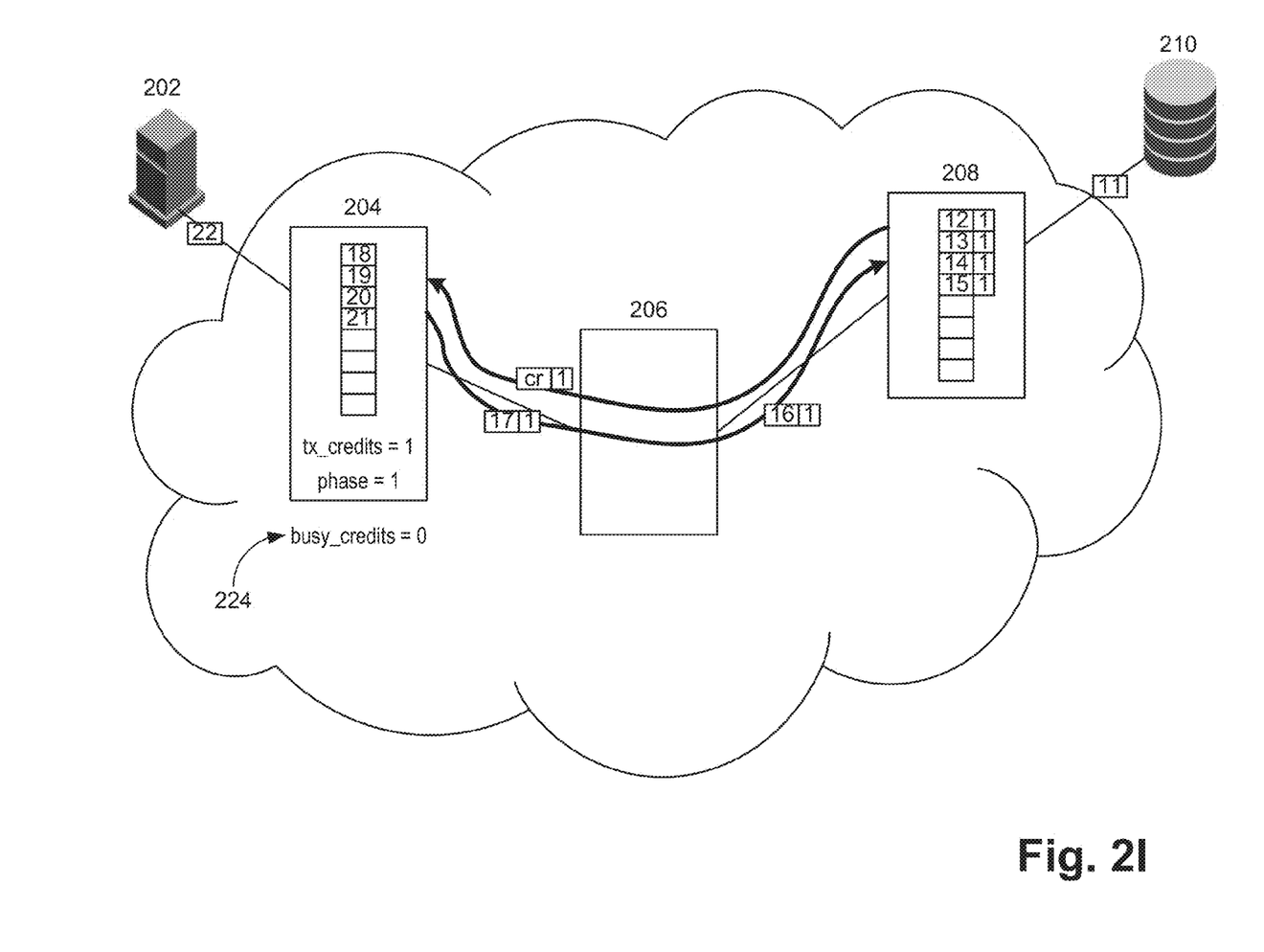

Turning now to FIG. 2I, credit 280 (FIG. 2H) has been received by device 204. When this credit 280 with its phase value of "1" 282 is detected, "busy_credits" 224 is stored away and stops decrementing. This signals the end of the credit check process.

The final value of "busy_credits" saved in the holding register indicates the results of the credit check process. Specifically, if "busy_credits" equals "0", this indicates that all credits were correctly accounted for. If "busy_credits" is greater than "0", the indicated number represents the number of credits that were lost during the check process. If "busy_credits" is less than zero, this indicates that there were excess credits received by device 204.

In the preferred embodiment illustrated in FIGS. 2A-2I, "busy_credits" is ideally equal to "0", which indicates that no credits were lost or gained. However, if credits were lost or gained, the "tx_credits" value may be incrementally and precisely adjusted to restore the proper number of credits to the flow-control system.

After the check has been performed, device 204 may freely toggle the phase setting back to "0" and begin another correctness check routine. The length of the correctness routine is determined by the round-trip time of the credit returns for each check cycle. However, if this frequency is insufficient, it is possible to introduce more phase states to divide the round-trip time into as many fractions as desired and perform multiple concurrent correctness checks. For example, phase states of "0," "1," and "2" could be used, and three concurrent correctness checks could be performed using those phase state settings.

Notably, data units must be flowing in order to perform the correctness check. As would be appreciated by those having ordinary skill in the art, if additional robustness is desired to handle long periods of idle activity, device 204 may start a timer upon sending a data unit once the phase state has changed. When the timer reaches the maximum time for which any data unit would be expected to be returned to the originating device, it is then safe to assume that the current value of "busy_credits" should be zero. However, if the "busy_credits" value is not zero, the non-zero value is handled per the correctness check process previously discussed. As will be appreciated by those having ordinary skill in the art, this timer routine embodiment is dependent upon having a system where the upper-bound of time until a credit is returned is well defined.

Figure 3A:
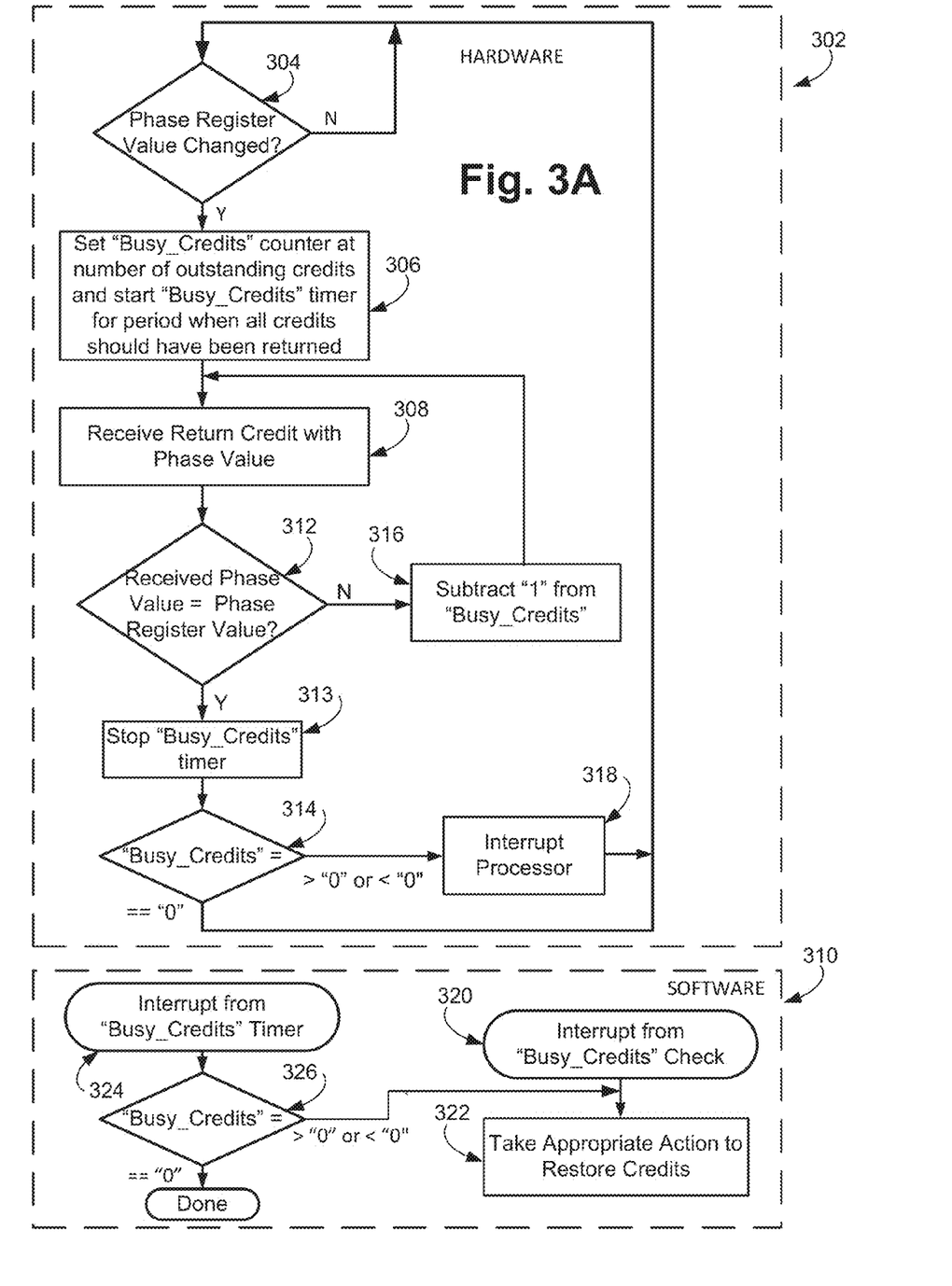
FIGS. 3A and 3B are flowcharts of operations according to the present invention.

As would be understood by those having ordinary skill in the art, the counting performed by device 202 is performed by device hardware, as opposed to software stored on the device. For example, turning to FIG. 2B, each data unit transmitted, such as data unit 223, and each credit received, such as credit 232, is counted using a hardware counter on device 202. However, if "busy_credits" is less or greater than zero, then the software stored on device 202 appropriately handles the discrepancy. This may best be illustrated by FIG. 3, which illustrates the steps of one of the embodiments of the present invention discussed above. In the preferred embodiment most of the steps are performed in hardware 302 due to the speed of the various transmissions. First, a determination is made whether the value of the phase register has changed at step 304. If not, operation loops at step 304 waiting for the processor to change the value to start the measurement. If the value has changed, in step 306 the "busy_credits" counter value is set at the number of outstanding credits and a "busy_credits" timer is started, the time having a period when all credits should have been returned. In step 308 a return credit is received. This return credit will have a phase value. Initially this value will be different from the phase register value as a round trip time has not yet happened. In step 312 a determination is made whether the phase value of the return credit is equal to the value of the phase register. If not, then outstanding credits are being received and in step 316 the "busy_credits" counter is decremented and operation returns to step 308 for the next return credit. If the phase value has become equal to the register value, then a round trip tie has been completed and all outstanding credits should be consumed. The "busy_credits" timer is stopped in step 313. In step 314 a determination is made whether the "busy_credits" counter value is equal to zero or not. If so, then there is no lost or missing credit and operation returns to step 304 to await the next test. If the value is non-zero, there is a credit problem and in step 318 an interrupt is issued to the processor to handle the problem. Operation returns to step 304.

Software operations 310 are initiated by the start of the "busy_credits" check interrupt at step 320. In step 322 the processor takes appropriate action to restore the proper number of credits by executing instructions stored on non-transitory medium. If the "busy_credits" timer expires, an interrupt is generated in step 324. In step 326 the "busy_credits" counter value is checked. If it is zero, then operations end. If it is not zero, step 322 is executed to correct the credit error.

Figure 3B:
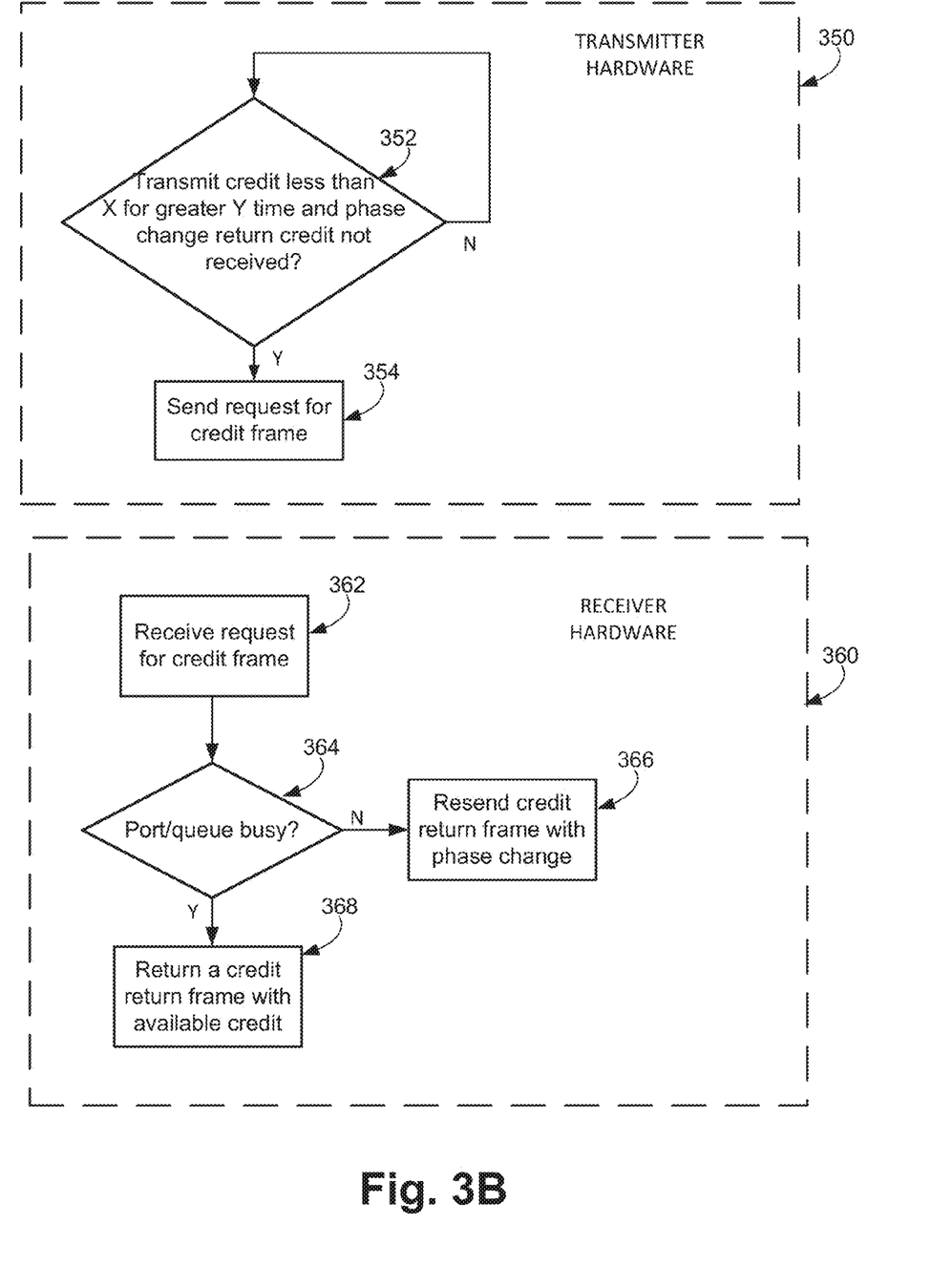

While the "busy_credit" timer does provide a failsafe for correcting credit if the receiver has not returned credit for some time and the return credit frame with the phase change is lost, the period is typically very long and an earlier correction is desired. This is shown in FIG. 3b. Two portions are present here, transmitter hardware 350 and receiver hardware 360. The transmitter hardware 350 is continually monitoring in step 352 to determine if the "tx_credit" value has been below a given number for at least a set period. If the condition does occur, in step 354 the transmitter hardware sends a request for a credit frame to the receiver. This will force the receiver to return any available credit. The return credit frame will have the proper phase.

In step 362 the receiver hardware receives the request for credit frame. In step 364 the receiver hardware 360 determines is the appropriate port or queue is busy, i.e. is performing other operations, then in step 368 a return credit fame with the available credit and with the proper phase is returned. This would be handled by step 308 of the transmit hardware 302 and the returned credit will be subtracted. It is noted that step 318 indicates a subtraction of one form the counter but in this instance more than one credit may be returned, so a larger value may be decremented if appropriate. If the port or queue is not busy, this indicates the frame with the phase change was lost traveling to the receiver. So in step 366 the receiver hardware 360 transmits a return credit frame including the phase change. This will be handled by steps 308, 312 and then 314 by the transmitter hardware 302. Thus if the receiver is not busy, a "busy_credits" counter check will be forced.

Figure 4:
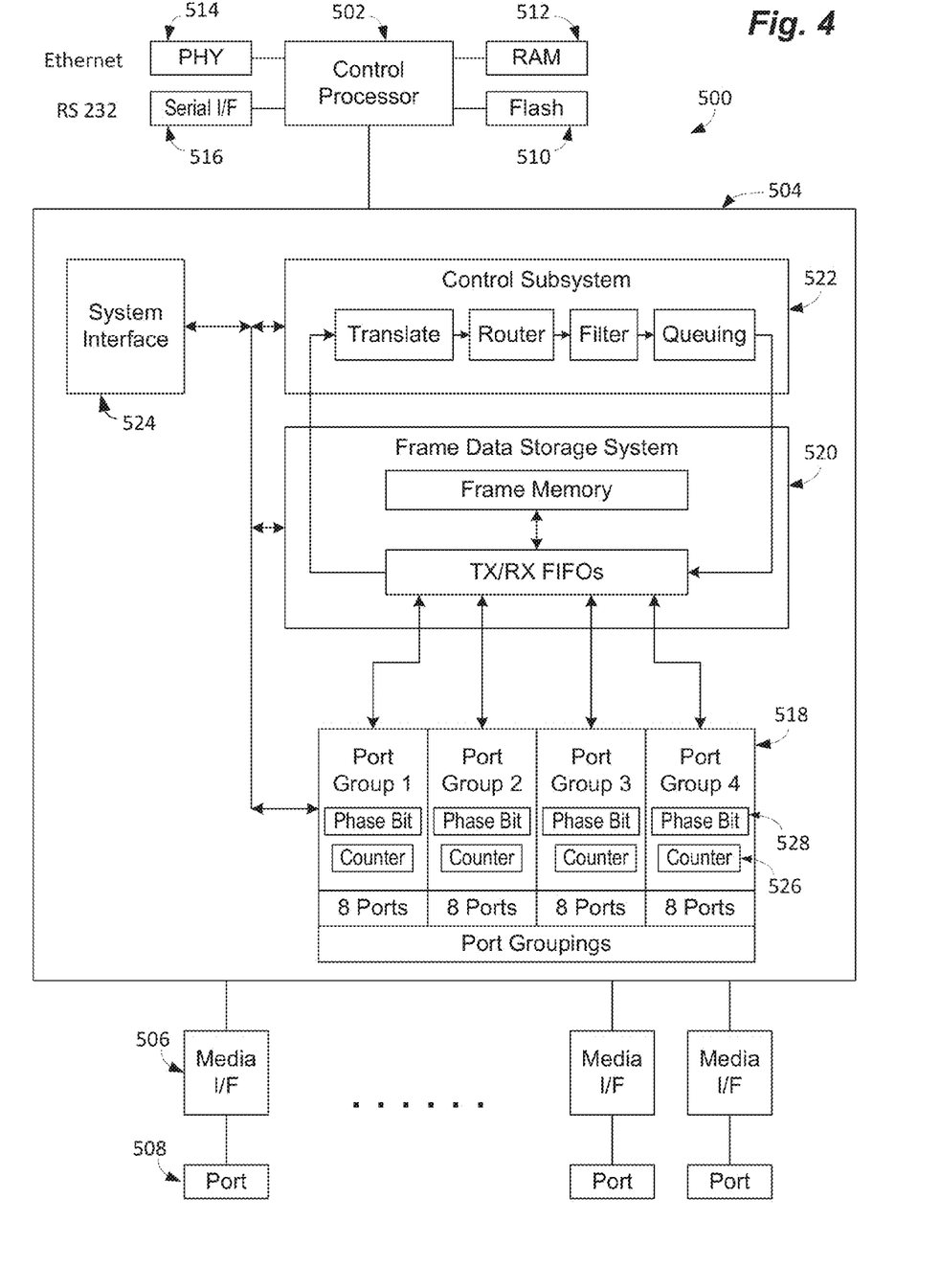
FIG. 4 is a block diagram of a Fibre Channel switch according to the present invention.
Figure 5:
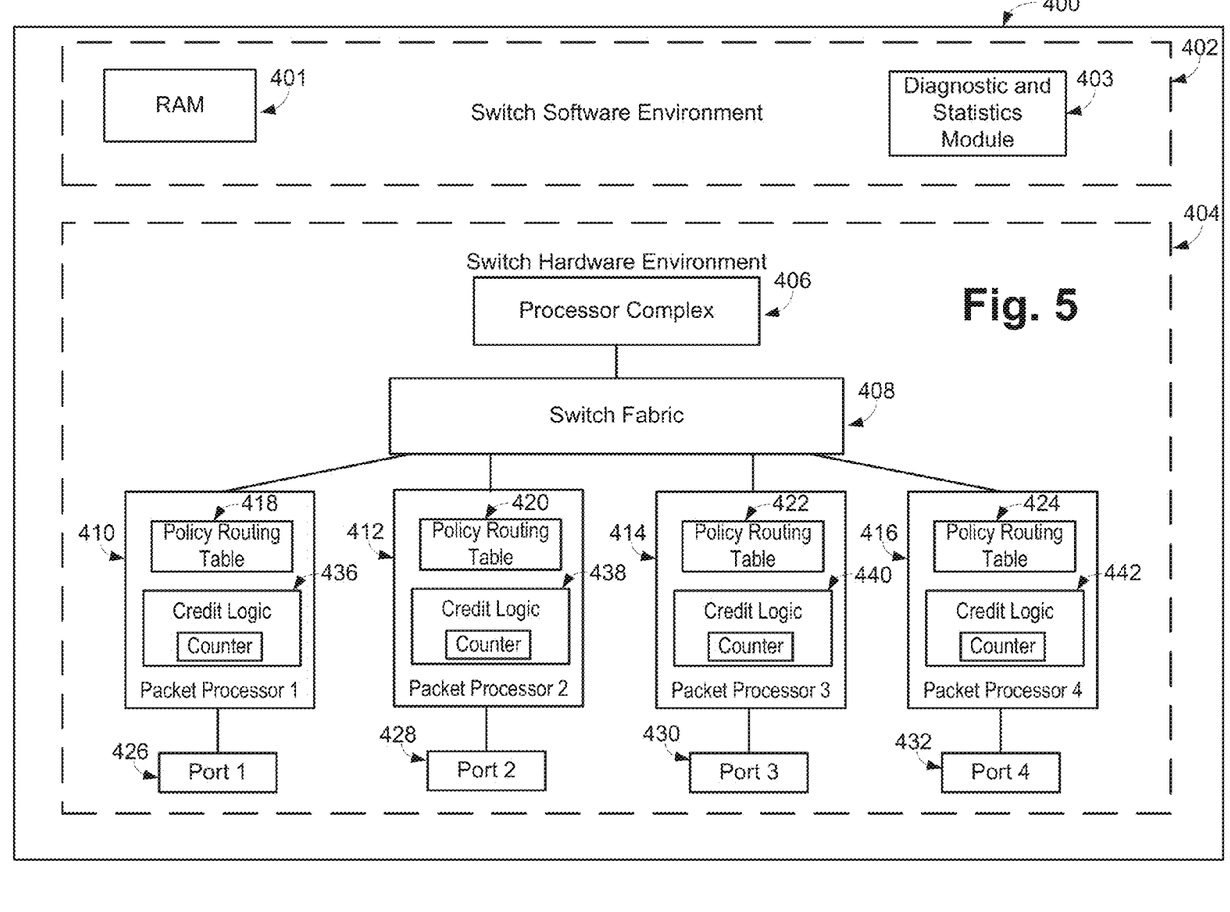
FIG. 5 is a block diagram of an Ethernet switch according to the present invention.

The present invention may be incorporated into a FC switch or Ethernet switch, as illustrated in FIGS. 4 and 5. Turning first to FIG. 4, a block diagram of a FC switch 500 that may be utilized in accordance with network 100 is illustrated. A control processor 502 is connected to a switch Application-Specific Integrated Circuit ("ASIC") 504. The switch ASIC 504 is connected to media interfaces 506 which are connected to ports 508. Generally the control processor 502 configures the switch ASIC 504 and handles higher level switch operations, such as the name server, the redirection requests, and the like. The switch ASIC 504 handles the general high speed inline or in-band operations, such as switching, routing and frame translation. The control processor 502 is connected to flash memory 510 to hold the software, to RAM 512 for working memory and to an Ethernet PHY 514 used for management connection and serial interface 516 for out-of-band management. The RAM 512 may store computer-executable instructions for performing specific functions, such as remediating counter discrepancies detected by the present invention. The switch ASIC 502 has four basic modules, port groups 518, a frame data storage system 520, a control subsystem 522 and a system interface 524. The port groups 518 perform the lowest level of packet transmission and reception, and includes a hardware counter 526 that counters transmitted data units and received credits. When the FC switch 500 is implemented in a network such as network 100, the credit counting functionality (e.g., counting for "tx_credits" and "busy_credits") for each port may be handled by hardware counters 526. The outgoing phase bit is contained in a register 528 which can be accessed by the processor 502 to initiate an end-to-end credit check. Generally, frames are received from a media interface 506 and provided to the frame data storage system 520. Further, frames are received from the frame data storage system 520 and provided to the media interface 506 for transmission out a port 508.

Turning now to FIG. 5, a block diagram of an Ethernet switch or router 400 that may be utilized with the present invention is shown. The Ethernet switch 400 comprises a switch software environment 402 and switch hardware environment 404. The software environment 402 includes a diagnostics and statistics module 403 to allow management software access to the various statistical counters in the switch 400, such as the receive and transmit rates for each port 426, 428, 430, 432. The software environment 402 also includes RAM 401, which stores computer-executable instructions for performing specific functions, such as remediating counter discrepancies detected by the present invention. The switch hardware environment 404 has a processor complex 406 which includes both RAM and flash memory for storing program instructions. The processor complex 406 is connected to a switch fabric 408, which provides the basic switching operations for the switch 400. The switch fabric 408 is connected to a plurality of packet processors 410, 412, 414, 416. Each packet processor 410, 412, 414, 416 has its own respective policy routing table 418, 420, 422, 424 to provide conventional packet analysis and routing. Each packet processor 410, 412, 414, 416 is connected to its own respective port or ports 426, 428, 430, 432. While conventional Ethernet operations do not include credit-based operations, an Ethernet switch according to the present invention may be enhanced to include credit operations similar to those discussed above with relation to Fibre Channel or other credit-based protocols. Each port has its own respective credit logic 436, 438, 440, and 442, the credit logic including the hardware counters. When the Ethernet switch 400 is implemented in a network such as network 100, the credit counting functionality (e.g., counting for "tx_credits" and "busy_credits") for each port 426, 428, 430, and 430 may be handled by hardware counters in the credit logic 436, 438, 440, 442 respectively. In stark contrast, the remedial functionality of the switch 400 may be handled by software instructions stored on RAM 401, which are executed by a switch processor.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
 transmitting data units including a first phase value in the data unit, wherein each transmitted data unit occupies a credit, a credit being an allocated flow control unit, a receiver having specified a given number of credits that may be outstanding before data flow must stop;
 receiving return credits including in the return credit a phase value equal to the phase value included in a corresponding received data unit, a return credit indicating the return of a credit to reduce the number of outstanding credits;
 transmitting data units including a second phase value in the data unit;
 generating a counter value equal to a number of outstanding credits when beginning to transmit data units having the second phase value; and
 decrementing, after generating the counter value, the counter value for each return credit received including the first phase value in the return credit.

2. The method of claim 1, wherein the decrementing stops when the return credit including the second phase value in the return credit is received.

3. The method of claim 2, further comprising:
 determining if the counter value is non-zero when decrementing stops; and
 generating an interrupt upon determining that the counter value is non-zero when decrementing stops.

4. The method of claim 3, further comprising:
 addressing the non-zero credit condition by a processor in response to the interrupt.

5. The method of claim 1, further comprising:
 setting a timer corresponding to the expected time it will take for both a first data unit to be transmitted and the return credit corresponding to the first data unit to be received.

6. The method of claim 1, further comprising:
 specifying the given number of credits; and
 wherein the number of outstanding credits is calculated by subtracting the number of credits that have not been returned from the given number of credits.

7. A network device comprising:
 a processor; and
 a network port coupled to said processor, said network port for:
  transmitting data units including a first phase value in the data unit, wherein each transmitted data unit occupies a credit, a credit being an allocated flow control unit, a receiver having specified a given number of credits that may be outstanding before data flow must stop;
  receiving return credits including in the return credit a phase value equal to the phase value included in a corresponding received data unit, a return credit indicating the return of a credit to reduce the number of outstanding credits;
  transmitting data units including a second phase value in the data unit;
  generating a counter value equal to a number of outstanding credits when beginning to transmit data units having the second phase value; and
  decrementing, after generating the counter value, the counter value for each return credit received including the first phase value in the return credit.

8. The network device of claim 7, wherein the decrementing stops when the return credit including the second phase value in the return credit is received.

9. The network device of claim 8, the network port further:
 determining if the counter value is non-zero when decrementing stops; and
 generating an interrupt upon determining that the counter value is non-zero when decrementing stops.

10. The network device of claim 9, further comprising:
 a non-transitory memory coupled to the processor and storing instructions for addressing the non-zero credit condition by a processor in response to the interrupt, wherein said instructions are executed by the processor in response to the interrupt.

11. The network device of claim 7, the network port further:
 setting a timer corresponding to the expected time it will take for both a first data unit to be transmitted and the return credit corresponding to the first data unit to be received.

12. The network device of claim 7, wherein the non-transitory memory further includes instructions for the processor to specify the given number of credits; and
 wherein the number of outstanding credits is calculated by subtracting the number of credits that have not been returned from the given number of credits.

* * * * *